United States Patent
Berninger et al.

(10) Patent No.: US 12,063,229 B1
(45) Date of Patent: *Aug. 13, 2024

(54) SYSTEM AND METHOD FOR ASSOCIATING CYBERSECURITY INTELLIGENCE TO CYBERTHREAT ACTORS THROUGH A SIMILARITY MATRIX

(71) Applicant: Google LLC, Mountain View, CA (US)

(72) Inventors: Matthew Berninger, Denver, CO (US); Barry Vengerik, Montclair, NJ (US)

(73) Assignee: GOOGLE LLC, Mountain View, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/676,755

(22) Filed: Feb. 21, 2022

Related U.S. Application Data

(63) Continuation of application No. 16/450,579, filed on Jun. 24, 2019, now Pat. No. 11,258,806.

(51) Int. Cl.
| | |
|---|---|
| *H04L 9/40* | (2022.01) |
| *G06F 18/213* | (2023.01) |
| *G06N 20/00* | (2019.01) |

(52) U.S. Cl.
CPC ........ *H04L 63/1416* (2013.01); *G06F 18/213* (2023.01); *G06N 20/00* (2019.01); *H04L 63/102* (2013.01); *H04L 63/1441* (2013.01)

(58) Field of Classification Search
CPC .............. H04L 63/1416; H04L 63/102; H04L 63/1441; G06N 20/00; G06K 9/6232
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |

(Continued)

FOREIGN PATENT DOCUMENTS

| | | | |
|---|---|---|---|
| GB | 2439806 | A | 1/2008 |
| GB | 2490431 | A | 10/2012 |

(Continued)

OTHER PUBLICATIONS

U.S. Appl. No. 16/450,579, filed Jun. 24, 2019 Notice of Allowance dated Oct. 6, 2021.

(Continued)

*Primary Examiner* — Meng Li
*Assistant Examiner* — Shu Chun Gao
(74) *Attorney, Agent, or Firm* — DORITY & MANNING P.A.

(57) ABSTRACT

A computerized method for associating cyberthreat actor groups responsible for different cyberthreats is described. The method involves generating a similarity matrix based on content from received clusters of cybersecurity information. Each received cluster of cybersecurity information is assumed to be associated with a cyberthreat. The similarity matrix is composed via an optimized equation combining separate similarity metrics, where each similarity metric of the plurality of similarity metrics represents a level of correlation between at least two clusters of cybersecurity information, with respect to a particular aspect of operations described in the clusters. The method further involves that, in response to queries directed to the similarity matrix, generating a listing of a subset of the clusters of cybersecurity information having a greater likelihood of being associated with cyberthreats caused by the same cyberthreat actor group.

27 Claims, 11 Drawing Sheets

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |

(56) References Cited

U.S. PATENT DOCUMENTS

| | | |
|---|---|---|
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Smael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,419,917 B2 * | 8/2016 | Eaton .................... H04L 47/785 |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |

(56) References Cited

U.S. PATENT DOCUMENTS

| | | |
|---|---|---|
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,553 B1 | 5/2019 | Schroeder et al. |
| 10,686,820 B1 * | 6/2020 | Sheffer ............... G06F 21/577 |
| 11,258,806 B1 | 2/2022 | Berninger et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |

(56) References Cited

U.S. PATENT DOCUMENTS

| | | |
|---|---|---|
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |

(56) References Cited

U.S. PATENT DOCUMENTS

| | | |
|---|---|---|
| 2012/0137367 A1 | 5/2012 | Dupont et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1* | 4/2015 | Haq .................. H04L 63/1416 726/23 |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Smael et al. |
| 2016/0021141 A1* | 1/2016 | Liu .................. H04L 63/1483 726/23 |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0004948 A1 | 1/2018 | Martin et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2020/0195662 A1* | 6/2020 | Black .................. H04L 67/306 |
| 2020/0198651 A1* | 6/2020 | Levy .................. G05D 1/0293 |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.-- mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r-990073, (Dec. 7, 2013).

(56) References Cited

OTHER PUBLICATIONS

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets—11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Placek, and Timothy N. Newsham, "Insertion, Evasion, and Denial of Service: Eluding Network Intrusion Detection", Secure Networks, ("Ptacek"), (Jan. 1998).

\* cited by examiner

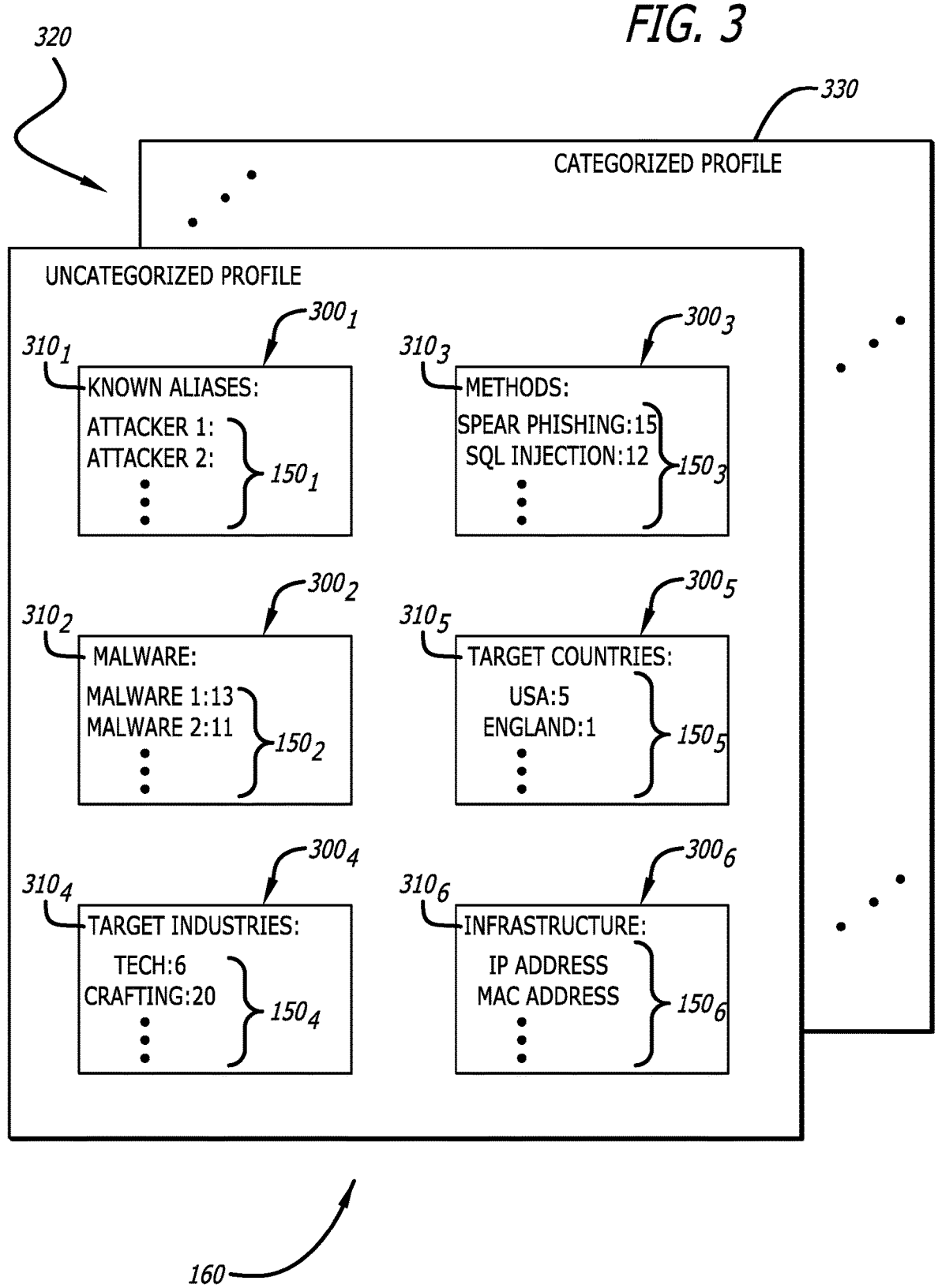

SYSTEM AND METHOD FOR ASSOCIATING CYBERSECURITY INTELLIGENCE TO CYBERTHREAT ACTORS THROUGH A SIMILARITY MATRIX

CROSS-REFERENCES TO RELATED APPLICATIONS

This application is a continuation of U.S. patent application Ser. No. 16/450,579, filed Jun. 24, 2019, now U.S. Pat. No. 11,258,806, issued Feb. 22, 2022, the entire contents of which are incorporated by reference herein.

FIELD

Embodiments of the disclosure relate to the field of cybersecurity. More specifically, one embodiment of the disclosure relates to a cyberthreat analysis system that is configured to automatically analyze and associate cyberthreats, and in particular cybersecurity intelligence representative of the cyberthreats, with existing or new cyberthreat actor groups.

GENERAL BACKGROUND

Cybersecurity threats (referred to as "cyberthreats") have become a pervasive problem for organizations as many networked devices and other resources have been subjected to attack and compromised. A cyberthreat constitutes an actual cyberattack on or a potential threat to the security of stored or in-transit data or of IT infrastructure produced or propagated by a cyberthreat actor group. For example, a cyberthreat may involve a cyberattack directed to the infiltration of content onto a network device, where the content may be a type of executable such as software that is intended to perpetrate malicious or criminal activity. Alternatively, the cyberthreat may involve malicious activities conducted by the cyberthreat actor group, without placement of malicious content onto the network device, in order to harm or co-opt operations of that network device or exfiltrate sensitive information from the network.

A "cyberthreat actor group" may include an individual cyberthreat actor or multiple (e.g., two or more) cyberthreat actors, where a "cyberthreat actor" is generally considered to be a person or entity operating as a nation-state attacker or a financially motivated attacker. The investigations conducted on each cyberthreat may uncover information that indicate activities, infrastructure, and/or malware that may be part of an intrusion, campaign, or other series of related actions that constitute a cyberattack. Identifying cyberthreat actor groups from this information has been extremely challenging due to the large amount of information that must be evaluated in order to identify a cyberthreat actor group with a high level of confidence. Additionally, the difficulty of discovering and investigating potential associations between cyberthreat actor groups responsible for different cyberthreats has increased as the amount of information to evaluate has increased.

Each year, a vast amount of cybersecurity intelligence is gathered by cybersecurity service providers based on hundreds of investigations and thousands of hours of analytics. The cybersecurity intelligence includes content pertaining to investigated cyberthreats, cyberthreats still under investigation, or a combination thereof. The cybersecurity intelligence may be provided from a number of sources. Currently, this cybersecurity intelligence is analyzed manually by expert human analysts in an attempt to identify cyberthreat actor groups, as each cyberthreat actor group tends to be associated with certain distinct characteristics. Besides the short supply of expert human analysts, this manual identification process is labor and time intensive, as human analysts may take days or weeks before she or he can associate a cluster of cybersecurity intelligence to a particular cyberthreat actor group. Therefore, as the amounts of cybersecurity intelligence (e.g., data about attacker activities) increases, this manual identification scheme does not scale in identifying cyberthreat actors and defending against new attempted cyberattacks.

BRIEF DESCRIPTION OF THE DRAWINGS

Embodiments of the invention are illustrated by way of example and not by way of limitation in the figures of the accompanying drawings, in which like references indicate similar elements and in which:

FIG. 3 is an exemplary block diagram of a profile maintained within the data store of FIG. 1.

DETAILED DESCRIPTION

Figure 1:
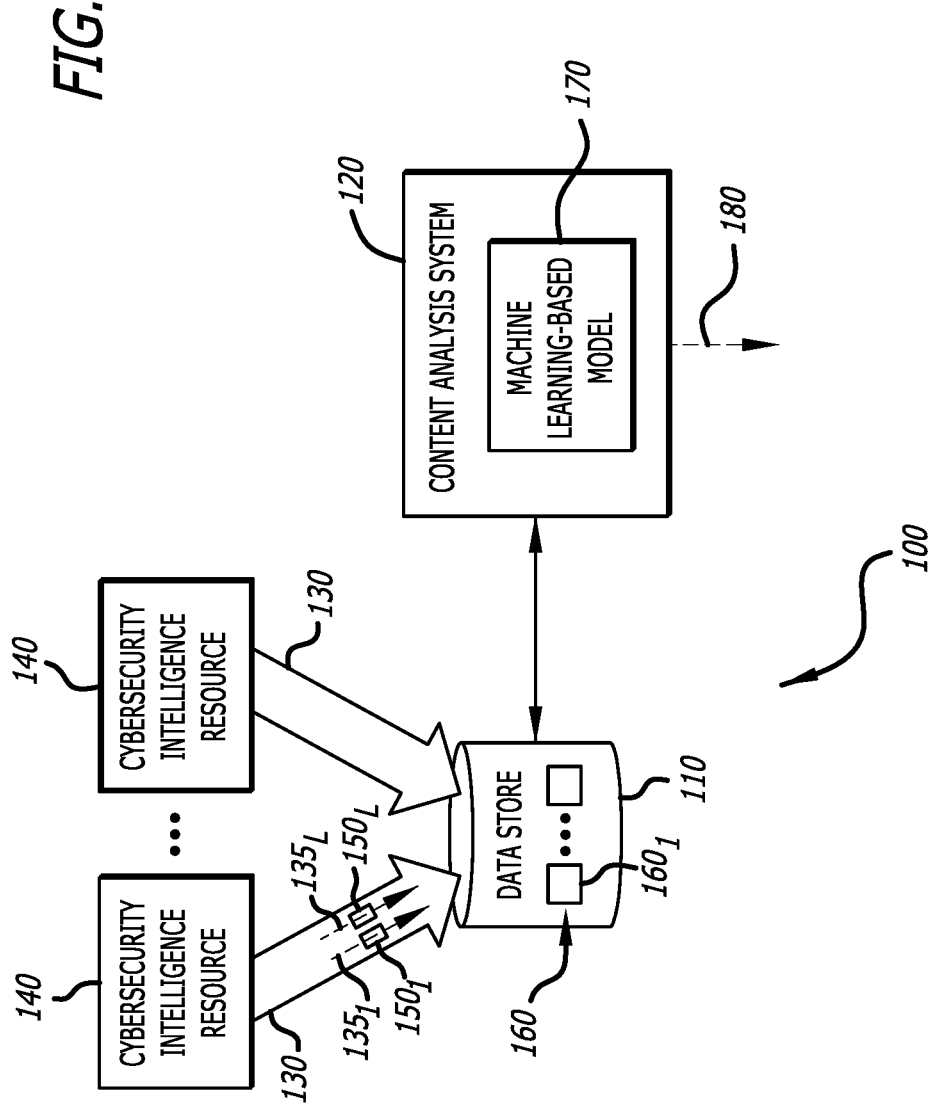
FIG. 1 is an exemplary block diagram of an exemplary embodiment of a cyberthreat actor identification platform including a data store and a cyberthreat analysis system.

Embodiments of the present disclosure generally relate to a cybersecurity threat (cyberthreat) analysis system, operating in accordance with a machine learning-based model, which conducts analytics on content from received cybersecurity intelligence to determine whether the received cybersecurity intelligence can be associated with existing cyberthreat actor groups. Such analytics is conducted to automate presentation of potential associations between unknown and known cyberthreat actor groups to provide greater efficiency in the use of analysts' time. Herein, the cyberthreat analysis system is adapted to utilize the machine learning-based model that optimizes a final modeling step by combining separate similarity values into a single similarity metric, using weightings (coefficients) learned from the machine learning-based model trained on the sampled, test profiles (datasets).

To achieve greater efficiency, a collection of forensically-related indicia (e.g., text consisting of characters, numbers and/or symbols; images, etc.) is obtained from each cluster of cybersecurity intelligence that is associated with a particular cyberthreat. Each indicium constitutes salient information pertaining to a particular type of content within a cybersecurity intelligence cluster (e.g., a malware name, an attacker alias, etc.) and the frequency of occurrence of such information within a cybersecurity intelligence cluster (e.g., a count representing a number of occurrences, etc.).

The forensically-related indicia may be maintained as part of a structured representation of that cybersecurity intelligence cluster, namely a predetermined data structure referred to as a "profile." Within each profile, related indicia may be grouped by category (i.e., indicia within the same category are grouped together). As an illustrative example, the forensically-related indicia may include tactic, technique, and procedure ("TTP") information, and thus, the profile may be structured to support a plurality of categories including, but not limited or restricted to the following categories: (i) known aliases, (ii) malware names, (iii) methods of installation and/or operation for the malware, (iv) targeted industries, (v) targeted countries, or (vi) infrastructure. A profile may be labeled "uncategorized" when the cyberthreat actor group, which is responsible for a cyberthreat to which the cyberthreat intelligence cluster is directed, has not been confirmed. Additionally, a profile may be labeled with a designation for a known cyberthreat actor group upon confirming that the known cyberthreat actor group is responsible for the cyberthreat summarized by the profile (referred to as a "categorized" profile).

Thereafter, in response to a triggering event (e.g., time-based trigger, change in a profile or predetermined number or percentage of profiles, etc.), the machine learning-based model may be updated by conducting analytics on the indicia included within the profiles in order to uncover connections between the actor group responsible for a cyberthreat (as identified by a corresponding cybersecurity intelligence cluster and represented by the profile) and any existing cyberthreat actor groups. Although, as an alternative embodiment, the machine learning-based model may be configured to conduct analytics on larger datasets than the profiles.

More specifically, according to one embodiment of the disclosure, the cybersecurity intelligence may be received from one or more network devices operating as cybersecurity intelligence resource(s) and are stored within a data store. A portion of the cybersecurity intelligence (referred to as a "cybersecurity intelligence cluster") may include content associated with one or more investigations that, over time, may increase in size, especially when the cybersecurity intelligence cluster is associated with an ongoing campaign. As a result, a profile is generated to maintain forensically-related indicia associated with each cybersecurity intelligence cluster and the number of occurrences of each indicium. The categories for indicia to be included in the profiles are determined by analysts as content within cybersecurity intelligence that provides more assistance in identifying cyberthreat actor groups responsible for cyberthreats than other content.

As described below, operating in accordance with the machine learning-based model, the cyberthreat analysis system conducts a multi-step analysis on content within the profiles to determine levels of correlation between the cybersecurity intelligence clusters associated with each of these profiles. For clarity, the operations of the multi-step analysis will be described for a single (first) profile that represents a particular cybersecurity intelligence cluster, albeit these operations may be performed iteratively on the entire corpus of profiles representing the received cybersecurity intelligence. The multi-step analysis is conducted to identify profiles within the corpus of profiles that have similar indicia and/or a determined a level of correlation, and as a result, identifies the cyberthreats represented by these profiles that may have been perpetrated by the same cyberthreat actor group or related cyberthreat actor groups.

For this embodiment of the disclosure, the multi-step analysis involves a first analytic conducted on indicia maintained in each profile category to produce feature vectors for each category. Each feature vector is configured to represent the distinctiveness of indicium within its category. For instance, as an illustrative example, the first analytic may convert each indicium (e.g., term), represented in a first format (e.g., text consisting of characters, numbers and/or symbols) and maintained in a first category of the first profile, into a result having a second format. The result represents the distinctiveness of that term within the first category as well as across the entire corpus of profiles accessible to the cyberthreat analysis system. As an example, the second format may constitute a value within a first prescribed range, where a higher value within the first prescribed range may represent the indicium is more distinctive and better representative content for the cybersecurity intelligence cluster.

Collectively, the results of the first analytic form a feature vector for the first category. Stated differently, where a category of the first profile has a total of "M" distinct terms (where M≥1), the feature vector for that category-profile combination is now represented as a M-dimensional feature vector. The first analytic is repetitive for each category within the first profile so that a feature vector is generated for each category of the first profile.

Additionally, a second analytic of the multi-step analysis is conducted between the feature vectors associated with each category of the first profile to feature vectors associated with corresponding categories from the other profiles within the corpus of profiles, which may include other "categorized" profiles and/or "uncategorized" profiles. The second analytic is conducted to determine a level of correlation (similarity value) between categories of different profiles, such as the first profile and any categorized or uncategorized profiles within the stored corpus of profiles. This "similarity value" may be represented by a value within a second prescribed range, where a higher value within the second prescribed range represents a higher correlation between features maintained within a specific category. The second analytic is further configured to generate a similarity vector (i.e., a collection of multiple similarity values between the first profile and another profile within the corpus of profiles).

Thereafter, the similarity vector is translated into a single similarity metric, where the above-described operations are conducted iteratively for all of the profiles to form an aggregate of similarity metrics. This aggregate, sometimes referred to as a "similarity matrix," allows an analyst to accurately determine through the generation of displayable or printable results, in real-time, the similarity between at least two profiles such as a reference profile (e.g., the first profile) and one of more other profiles within the corpus of profiles, for example. The displayable or printable results may be presented at a remote or local analyst workstation or console or later included in a variety of displayable or printable (hardcopy) reports. Moreover, the similarity matrix represents levels of correlation between cyberthreat actor groups that are responsible for the cybersecurity intelligence clusters associated with these profiles.

To improve performance, a weighting may be applied to some or all of the similarity values forming the similarity vectors in producing the similarity metric. The weighting is conducted to alter the relevance of certain indicia categories in identifying cyberthreat actor group responsibility based on changes in the threat landscape. Also, by maintaining the results from the first and second analytics, the cyberthreat analysis system may provide visibility as to the level of correlation between features within the profiles being compared as evidence for the conclusions reached by the machine learning-based model.

For instance, based on this determination, the cyberthreat analysis system may be configured to merge together multiple cybersecurity intelligence clusters that appear to be from the same unidentified cyberthreat actor group and update the profile associated with that merged cybersecurity intelligence cluster. Additionally, or in the alternative, the cyberthreat analysis system may be configured to alter the labeling of an uncategorized profile to now represent a new cyberthreat actor group or merge together multiple cybersecurity intelligence clusters that appear to involve the same identified cyberthreat actor group and update the categorized profile with content from the uncategorized profile.

Without a cyberthreat actor identification platform, described below, which analyzes and associates intelligence uncovered during an investigation to identify the cyberthreat actor group associated with the investigation, the number of uncategorized intelligence clusters will increase over time to a level in which they start to become a hindrance or distraction in continued efforts to identify cyberthreat actor groups.

According to one embodiment of the disclosure, the cyberthreat actor identification platform includes a data store and a cyberthreat analysis system. In general, the data store maintains cybersecurity intelligence, where each cybersecurity intelligence cluster may include information directed to an analysis of a cyberthreat (and/or multiple related cyberthreats) by a cybersecurity investigator (e.g., cybersecurity appliance, incident response team, cybersecurity expert, etc.). As an example, a cybersecurity intelligence cluster may include one or more incident response reports that describe the activity associated with a potential breach (e.g., malware type, activity, alias of cyberthreat actor group, targeted company and its industry, network (IP) address for downloaded malware, etc.). As another example, a cybersecurity intelligence cluster may include information associated with a prior analysis of malware or information associated with review of the current threat landscape as offered by cybersecurity investigators, such as observed campaigns or current cyberattack trends for example. The data store may be periodically or extemporaneously updated with cybersecurity intelligence.

The cybersecurity intelligence clusters associated with a particular cyberthreat may be relied upon to generate a profile. As one embodiment, the profile may be constructed to maintain indicia associated with different categories, namely different types of content that are considered to be helpful in determining cyberthreat actor groups. As an illustrative example, the profile may include multiple categories such as (i) actor alias, (ii) malware name (for detected malware belonging to the cyberattack), (iii) methods of installation and/or operation (e.g. spearfishing, powershell, etc.) for detected malware, (iv) targeted industries (e.g., governmental, military, energy, semiconductor, etc.), (v) targeted countries (United States, England, France, etc.), and/or (vi) infrastructure (e.g., communicative information such as Internet Protocol "IP" address, Media Access Control "MAC" address, host address, etc.). The data store is configured to maintain a corpus of profiles, including uncategorized profiles and/or categorized profiles.

According to one embodiment of the disclosure, the cyberthreat analysis system includes a processor and memory, which is configured to store logic for execution by the processor. Examples of the stored logic may include, but is not limited or restricted to model generation subsystem, model application subsystem and reporting subsystem. The model application subsystem further includes content aggregation logic, cyberthreat analytic logic and model optimization logic, as described below.

Herein, according to this embodiment, the model generation subsystem is configured to generate a machine learning-based model supplied to the model application subsystem. The model application subsystem is configured to apply the model to the stored cybersecurity intelligence, namely the corpus of profiles, to evaluate similarities between the stored cybersecurity intelligence. The similarities provide guidance to analysts toward identifying cyberthreat actor groups involved in different cyberthreats as represented by the received cybersecurity intelligence clusters. In particular, for this embodiment, the model is configured to convert content within the corpus of profiles into the similarity matrix (described above), which may be queried by analysts to receive a ranking of profiles than are most similar (i.e., indicia suggests highest potential of the cyberthreat associated with the profile as originating from the same or related cyberthreat actor group). This conversion is accomplished in accordance with the multi-step analysis described herein and illustrated in FIGS. 5A-7.

More specifically, the model generation subsystem is configured to generate a model by analyzing the contents of the data store. In some embodiments, the model generation subsystem accesses a first portion of content maintained within the data store to generate a model and a second portion of content maintained within the data store to verify the generated model. In particular, the model generation subsystem is configured to receive information regarding known cyberthreats (e.g., forensically-related indicia sampled from multiple "categorized" profiles stored within the data store. There is then a sampling of these profiles to produce a number of smaller test profiles (sometimes referred to as "test datasets). According to one embodiment of the disclosure, these test profiles are then processed through the cyberthreat analytic logic described above to create a 'test' similarity matrix, in which some pairs of test profiles are known to be related, and others are known to not be related.

Based on these test profiles, the model may be "tuned" by the model generation subsystem to improve operation by confirming that certain test profiles associated with forensically-related indicia procured from a particular profile, and thus pertaining to a particular known cyberthreat actor group, is determined by the model to be correlated to that known cyberthreat actor group. The tuning may be accomplished by applying the (labeled) test profiles to the model, and through machine learning inference logic (e.g., linear regression or other regression schemes), the weightings to be applied to the similarity metrics is "learned" to improve the accuracy of the model in identifying correct categorized profile associated with the test profiles.

The model application subsystem receives the model generated by the model generation subsystem and applies the corpus of profiles, including the content associated with the "uncategorized" profiles. In particular, the content aggregation logic of the model application subsystem is configured to access information regarding the corpus of profiles (e.g., forensically-related indicia maintained in "categorized" profiles and "uncategorized" profiles) and separate forensically-related indicia associated with each category of the profiles for subsequent processing by the cyberthreat analytic logic. As a result, where each profile is segmented into "N" categories (N≥1, e.g., N=6), the content aggregation logic produces "N" feature groupings of forensically-related indicia, where each "feature grouping" corresponding to a particular category.

Thereafter, the cyberthreat analytic logic is configured to conduct the multi-step analysis on content within the profiles to determine levels of correlation between the cybersecurity intelligence clusters associated with each of these profiles. The multi-step analysis involves a first analytic that is conducted on the first portion of content, namely the forensically-related indicia associated with the "N" categories, to produce "N" feature vectors. Each feature vector includes values associated with each indicium within that profile category. According to one embodiment of the disclosure, each value is generated based on a Term Frequency-Inverse Document Frequency (TF-IDF) conversion technique (described below) to determine which indicia are more important to a determination of a cyberthreat actor group than other indicia. Also, it is contemplated that each cyberthreat actor group and category may be generally represented as a feature vector (or, more generally, a data structure) containing feature scores. Other embodiments for the first analytic may include alternative ranking analysis systems to accomplish similar feature scores.

The cyberthreat analytic logic is further configured to conduct a second analytic on combinations of feature vectors to determine the difference between cyberthreat actor groups. In some embodiments, feature vector similarity may be determined using, for example, Cosine Similarity (described below). Stated differently, the cyberthreat analytic logic is configured to conduct the second analytic on the feature vectors to determine a level of correlation between feature vectors representing categories of different profiles. The level of correlation may be represented by a particular feature score (i.e., similarity value) within the second prescribed range, where a feature score towards the ends of this range identifies higher/lower levels of correlation (e.g., increased/decreased similarity). These similarity values, collectively operating as a similarity vector, may be subsequently used to determine a level of correlation between an identified, cyberthreat actor group associated with a reference profile and one or more cyberthreat actor groups among a corpus of profiles.

Thereafter, the model optimization logic is configured to convert the similarity vectors into the similarity matrix, as described above. According to one embodiment of the disclosure, the model optimization logic may allow for the alteration of the weighting for each of the similarity values, without changes to other model functionality.

Additionally, the model application subsystem further receives information pertaining to an association between a previously uncategorized, cyberthreat actor group and another cyberthreat actor group in order to effectuate a merge (or combination) of cybersecurity intelligence for both actor groups. Based on the merging of the information, the model is regenerated for application to newly received information.

The reporting logic receives information associated with merged cyberthreat actor groups and generates reports (e.g., organized information directed to a "merge" operation or signaling, such as an alert, with information to access the organized information) for further investigation by cyberthreat analysts and/or for alerting cybersecurity investigators and/or administrators. In some embodiments, cybersecurity investigators may receive information associated with newly merged cyberthreat actor groups to assess network and system vulnerability associated with that cyberthreat actor group.

In some embodiments of the invention, the cyberthreat analysis system operating as an analytic tool may be advantageously used by a cybersecurity analyst to aid in the targeted analysis of an unknown cyberthreat actor group to determine if it is part of a particular known cyberthreat actor group.

I. Terminology

In the following description, certain terminology is used to describe aspects of the invention. In certain situations, the terms "logic" and "subsystem" are representative of hardware, firmware, and/or software that is configured to perform one or more functions. As hardware, the logic (or subsystem) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with hardware circuitry, the logic (or subsystem) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or subsystem) may be stored in persistent storage.

The term "network device" should be generally construed as physical logic (electronics) or virtualized logic with data processing capability and/or a capability of connecting to any type of network, such as a public network (e.g., internet), a private network (e.g., any type of local area network), a public cloud network (e.g., Amazon Web Service (AWS®), Microsoft Azure®, Google Cloud®, etc.), or a private cloud network. Examples of a network device may include, but are not limited or restricted to, any of the following: a server; a mainframe; a firewall; a data transfer device (e.g., intermediary communication device, router, repeater, portable mobile hotspot, etc.); an endpoint device (e.g., a laptop, a smartphone, a tablet, a desktop computer, a netbook, gaming console, etc.); or a virtual device being software that supports data capture, preliminary analysis of meta-information associated with cybersecurity intelligence.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

In certain instances, the terms "compare," comparing," "comparison," or other tenses thereof generally mean determining if a match (e.g., identical or a prescribed level of correlation) is achieved between two items where one of the items may include content within meta-information associated with the feature.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

A. Cyberthreat Actor Identification Platform

Referring to FIG. 1, a block diagram of an exemplary embodiment of a cyberthreat actor identification platform (hereinafter, "platform") 100 is shown. Herein, the platform 100 includes at least a data store 110 and a cyberthreat analysis system 120 that is communicatively coupled to the data store 110. The data store 110 is configured to receive cybersecurity intelligence 130 from one or more cybersecurity intelligence resources ("resources") 140. The cybersecurity intelligence 130 includes a plurality of cybersecurity intelligence clusters $135_1$-$135_L$ (L≥2), where each cybersecurity intelligence cluster $135_1$-$135_L$ may be a collection of intelligence associated with one or more investigations directed toward a particular cyberthreat. For example, a first cybersecurity intelligence cluster $135_1$ may be an accumulation of evidence acquired from multiple investigations of a cyberthreat campaign or from a single investigation for example. Alternatively, the first cybersecurity intelligence cluster $135_1$ may be information acquired from one or more prior analyses of malware or information associated with review of the current threat landscape as offered by cybersecurity investigators, such as observed campaigns or current cyberattack trends for example.

Each cybersecurity intelligence cluster $135_1$ ... or $135_L$ may be represented by certain forensically-related indicia $150_1$ ... or $150_L$ contained therein. For this embodiment of the disclosure, the forensically-related indicia $150_1$ may constitute salient information from a cybersecurity intelligence cluster $135_1$, where each indicium of the forensically-related indicia $150_1$ pertains to one of a plurality of content types (categories). A structured representation of the forensically-related indicia 150 (e.g., indicia $150_1$) associated with a cybersecurity intelligence cluster 135 (e.g., cluster $135_1$) may be referred to as a "profile" 160 (e.g., profile $160_1$).

As further shown in FIG. 1, according to one embodiment of the disclosure, the cyberthreat analysis system 120 is configured to generate and/or utilize a machine learning-based model 170. The model 170 is adapted to receive a form of cybersecurity intelligence and provide results 180 based on running the cybersecurity intelligence through the model 170. According to one embodiment of the disclosure, the results may be represented as (i) an organized grouping (i.e. listing) of profiles that are sorted based on levels of correlation (i.e., similarity metrics) computed between a reference profile and the listed profiles, (ii) a listing of profiles that are sorted based on highest levels of correlation with a reference profile, or the like.

B. Cyberthreat Data Store

Figure 2:
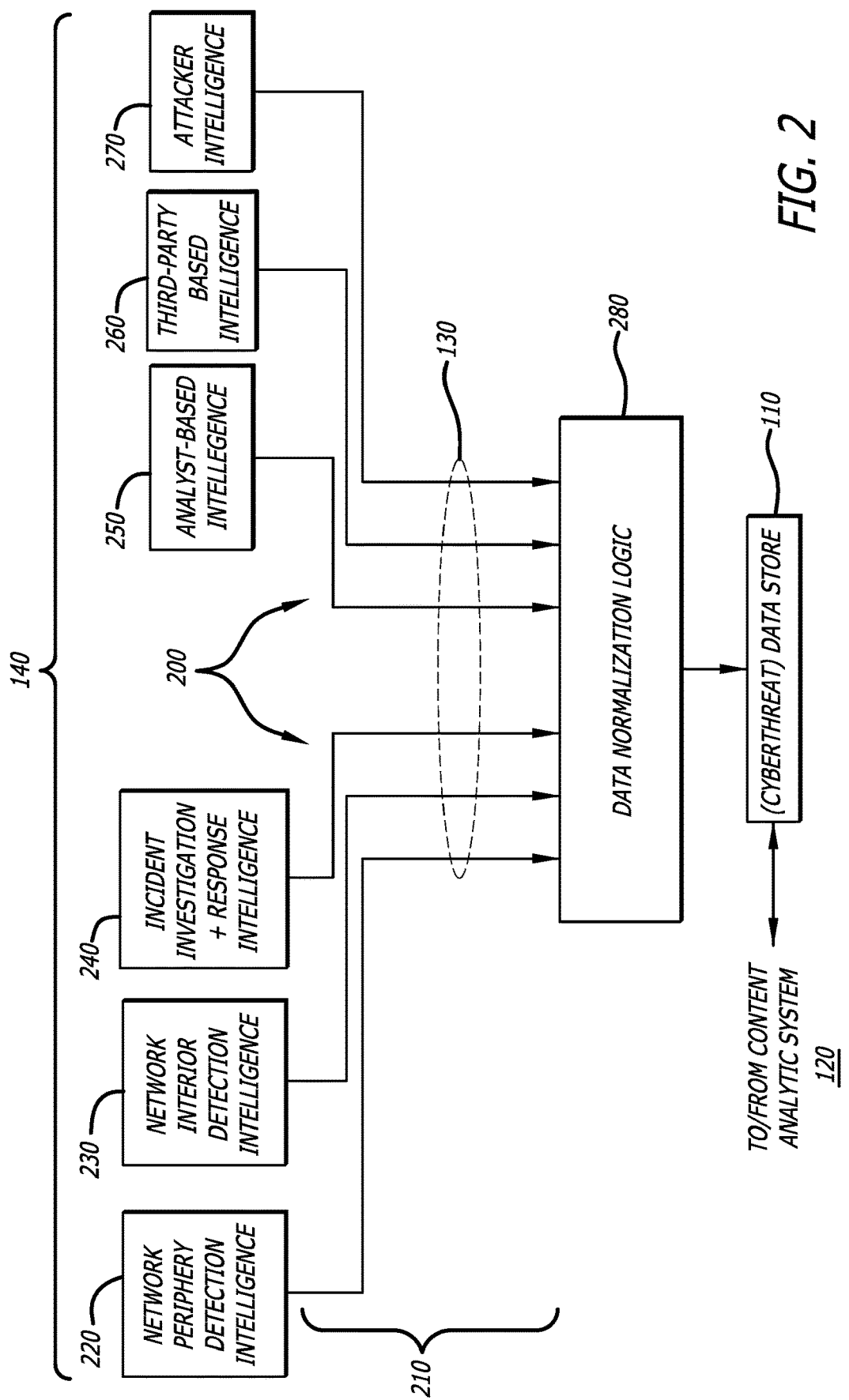
FIG. 2 is an exemplary block diagram of the data store of FIG. 1 communicatively coupled to cybersecurity intelligence resources.

Referring now to FIG. 2, an exemplary block diagram of the data store 110 communicatively coupled to the cybersecurity intelligence resources 140 of FIG. 1 is shown. For this embodiment of the disclosure, the cybersecurity intelligence resources 140 may supply cybersecurity intelligence 130 from various locations over transmission medium 200 forming a wired or wireless network 210. Delivered by the cybersecurity intelligence resources 140 using a push and/or pull communication schemes, the cybersecurity intelligence 130 may include, but is not limited or restricted to one or more of the following: (a) network periphery detection intelligence 220, (b) network interior detection intelligence 230, (c) incident investigation/response intelligence 240, (d) analyst-based intelligence 250, (e) third-party based intelligence 260, and/or (f) attacker intelligence 270. Given that different the cybersecurity intelligence 130 may have a different formats, data normalization logic 280 is interposed between the cybersecurity intelligence resources 140 and the data store 110 to generate a standardized format for the cybersecurity intelligence 130 prior to storage within the data store 110.

More specifically, the cybersecurity intelligence 130 corresponds to malware analytics or information collected for such malware analytics. For instance, the network periphery detection intelligence 220 includes cybersecurity intelligence gathered from analyses of network traffic received by an appliance, a firewall or other network devices to detect certain types of cyberthreats, namely malicious intrusions, into a protected network. This intelligence 220 may include Uniform Resource Locators (URLs) associated with malicious email or other components and/or meta-information extracted from the network traffic. The network interior detection intelligence 230 includes cybersecurity intelligence gathered from analyses of information by network devices connected within the network after passing the periphery (e.g., software agents within endpoints, email servers, etc.) in order to detect and gather meta-information associated with cyberthreats, such as malicious operations, being attempted on network devices within the network itself.

The incident investigation/response intelligence 240 includes cybersecurity intelligence gathered by cyberattack incident investigators during analyses of successful cyberattacks. This type of cybersecurity intelligence tends to identify the nature and source of a detected cyberthreat, such as the following: name/alias of malware associated with the cyberthreat; how the malware gained entry on the network;

target or targets of the cyberattack by company name, industry and/or location; and/or any remediation attempts conducted and the results of any attempts.

As further shown in FIG. 2, the analyst-based intelligence 250 includes cybersecurity intelligence gathered by highly-trained cybersecurity analysts, who analyze the detected malware to produce meta-information directed to its structure and code features. The third-party based intelligence 260 includes cybersecurity intelligence gathered from reporting agencies and other cybersecurity providers, which may be company, industry or government centric. Lastly, the attacker intelligence 270 includes cybersecurity intelligence gathered on known cyberthreat actor groups that is responsible (e.g., initiated) or is actively involved in the cyberthreat. Such cybersecurity intelligence may be directed as to whom are the attackers (e.g., name, location, etc.), whether state-sponsored attackers as well as common tools, technique and procedures used by a particular attacker that provide a better understanding the typical intent of the cyberthreat actor group (e.g., product disruption, financial information exfiltration, etc.), and the general severity of cyberthreats initiated by a particular attacker.

Collectively, some or all of these types of cybersecurity intelligence 130 may be stored and organized within the data store 110 in which each of the profiles 160 is representative of the cyberthreat associated with a cluster of each particular type of cybersecurity intelligence or perhaps multiple clusters of the same or different types of cybersecurity intelligence.

III. Profile

Referring to FIG. 3, an exemplary block diagram of an exemplary data structure utilized for profiles maintained within the data store 110 of FIG. 1 is shown. Herein, each profile 160 is a structured representation of a cybersecurity intelligence cluster (e.g., cybersecurity intelligence cluster $135_1$ of FIG. 1) associated with a particular cyberthreat. As the cybersecurity intelligence cluster $135_1$ may include content associated with more than one investigations, where additional content is acquired over time during analyses of a cyberthreat campaign for example, the size of the cybersecurity intelligence cluster $135_1$ may increase in size. Therefore, the profile 160 may be updated as more cybersecurity intelligence associated with the cyberthreat (e.g., a cyberattack, campaign, etc.) is detected.

According to one embodiment of the disclosure, the profile 160 may be configured with a plurality of logical storage regions $300_1$-$300_N$ (N≥1, e.g., N=6), where each logical storage region $300_1$-$300_6$ is responsible for maintaining a specific type (category) of forensically-related indicia therein. More specifically, for this embodiment of the profile 160, the forensically-related indicia $150_1$ ... or $150_6$ may be maintained within logical storage regions $300_1$-$300_6$, each corresponding to a particular category $310_1$-$310_6$, respectively. The frequency of occurrences of certain indicium within the cybersecurity intelligence cluster $135_1$ (e.g., counts) may be maintained in the logical storage regions $300_1$-$300_6$ as well.

As further shown in FIG. 3, the categories for each profile 160 may be static, where these particular categories $310_1$-$310_6$ are determined by analysts as particular types of content that tend to provide assistance in identifying a cyberthreat actor group responsible for a cyberthreat. For this illustrative embodiment of the profile 160, the indicia $150_1$ ... or $150_6$ may include tactic, technique, and procedure ("TTP") information, and thus, the profile 160 may be structured to support the indicia $150_1$ ... and/or $150_6$ pertaining a plurality of categories $310_1$ ... and/or $310_6$. The categories $310_1$-$310_6$ may include, but are not limited or restricted to the following: (i) known aliases $310_1$ (e.g., alias "attacker1," "attacker 2," etc.); (ii) malware names $310_2$, (iii) methods $310_3$ of installation and/or operation for the malware (e.g., spearfishing, powershell, etc.), (iv) targeted industries $310_4$ (e.g., energy, semiconductor, etc.), (v) targeted countries $310_5$ (e.g., United States, England, France, etc.), or (vi) infrastructure $310_6$ (e.g., communicative information such as Internet Protocol "IP" address, Media Access Control "MAC" address, host address, etc.).

A corpus of profiles 320, including the profile 160, is maintained for each of the cybersecurity intelligence clusters. A profile within the corpus of profiles 320 (e.g., profile 160) may be labeled "uncategorized" (UNC) when its cyberthreat actor group has not been confirmed for that profile 160. Alternatively, a profile within the corpus of profiles 320 (e.g., profile 330) may be labeled with a designation for that known cyberthreat actor group when confirmed for that profile 330 (referred to as "categorized" profile). For this embodiment, the label may include an alphanumeric identifier to identify the known cyberthreat actor group.

IV. Cyberthreat Analysis System

A. Operational Flow for Model Generation/Application

Figure 4A:
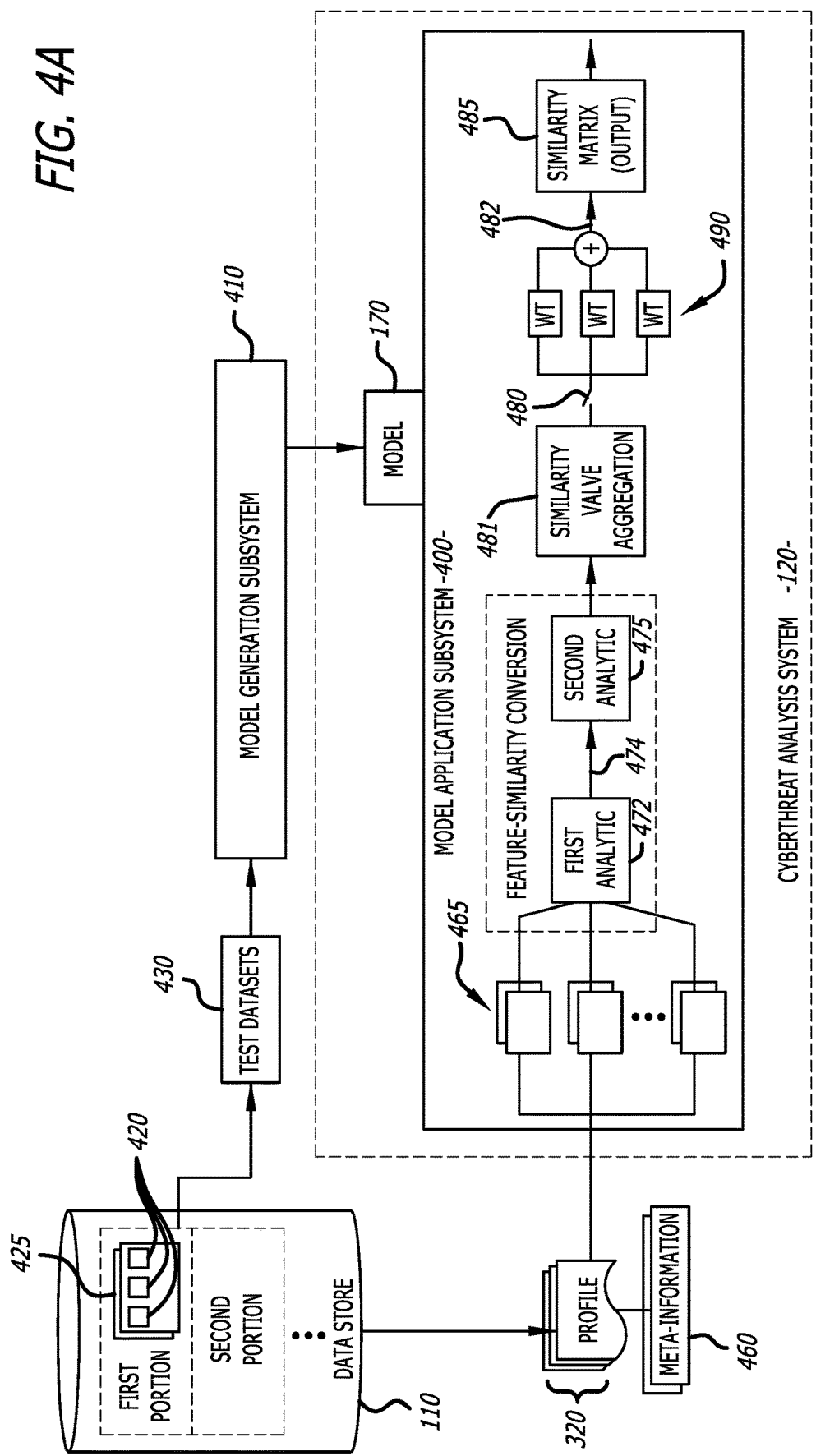
FIG. 4A is an exemplary block diagram of an operational flow for model generation and usage by the cyberthreat analysis system of FIG. 1.

Referring to now FIG. 4A, an exemplary block diagram of the operational flow for model generation and usage by the cyberthreat analysis system 120 of FIG. 1 is shown. For this embodiment of the disclosure, the cyberthreat analysis system 120 includes a model application subsystem 400, which is communicatively coupled to a model generation subsystem 410. Herein, the model application subsystem 400 may be deployed within the cyberthreat analysis system 120 of FIG. 1. However, the model generation subsystem 410 may be deployed as part of the cyberthreat analysis system 120, or alternatively, the model generation subsystem 410 may be deployed separately from the cyberthreat analysis system 120, as shown. As an illustrative example, the model generation subsystem 410 may be implemented as a separate cloud service that generates and provides the machine learning-based model 170 to at least the cyberthreat analysis system 120. As another illustrative example, the model generation subsystem 410 may be implemented as a separate network device (e.g., web server(s), data transfer device, etc.) that is communicatively coupled with the cyberthreat analysis system 120 to provide the machine learning-based model 170 (and any updated thereto) to the model application subsystem 400.

Figure 4B:
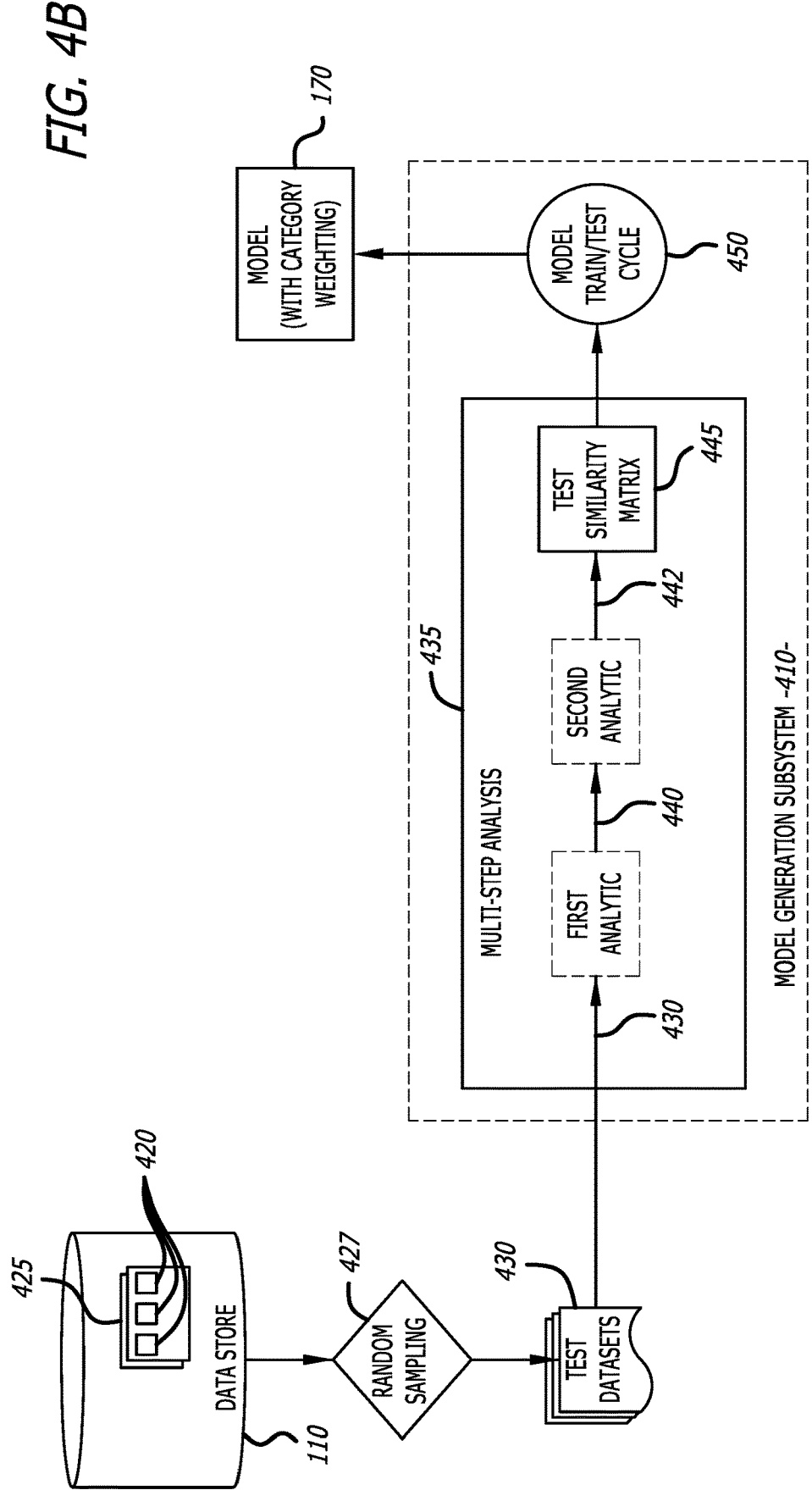
FIG. 4B is an exemplary block diagram of a model generation subsystem communicatively coupled to a model application subsystem deployed within the cyberthreat analysis system of FIG. 4A.

As shown in FIGS. 4A-4B, according to this embodiment, the model generation subsystem 410 is configured to generate the model 170 based on a first portion of content 420 maintained within the data store 110. More specifically, as shown in FIG. 4A, the model generation subsystem 410 samples the first portion of content 420, namely forensically-related indicia sampled from multiple "categorized" profiles 425 stored within the data store 110. The sampling of the forensically-related indicia 420 may be randomized (operation 427) to produce a number of test profiles 430 from the forensically-related indicia 420, as shown in FIG. 4B. For instance, each test profile 430 may be a pair of indicium associated with the forensically-related indicia 420 that may pertain to (i) the same profile category but any of the "categorized" profiles 425 or (ii) any profile category from any of the "categorized" profiles.

Each of the test profiles 430 may undergo a multi-step analysis (see FIGS. 5A-5D) 435 that performs an initial conversion of the content of each test profile 430 into a pair of feature vectors 440, which are converted into a pair of similarity values 442 that operate as a similarity vector.

Thereafter, similarity vectors for each and every pairwise combination of forensically-related indicia 420 from the categorized profiles 425 are aggregated to form a test similarity matrix 445.

The contents of the test similarity matrix 445 are made available to an interim model 450 for training (test cycles) to "learn" and ultimately produce the machine learning-based model 170. Stated differently, the machine learning-based model 170 may be "tuned" by the model generation subsystem 410 to improve operation by confirming that certain similarity vectors, based on portions of the forensically-related indicia 420 procured from a particular "categorized" profile, are determined by the model 170 to be correlated to that particular "categorized" profile. Thereafter, as a prescribed level of accuracy of the analytics conducted by the interim model 450 on the randomized test profiles 430 achieves a prescribed threshold, the resultant machine learning-based model 170 is provided to the model application subsystem 400.

Referring back to FIG. 4A, the model application subsystem 400 receives the machine learning-based model 170 generated by the model generation subsystem 410 and receives, as input, content associated with the stored corpus of profiles 320 along with meta-information 460 associated with each profile (e.g., profile identifier, etc.) from the data store 110. The stored corpus of profiles 320 may include forensically-related indicia associated with "categorized" profiles that represent identified cyberthreat actor groups and/or "uncategorized" profiles that represent unidentified cyberthreat actor groups, as described above and illustrated in FIG. 3. The model application subsystem 400 receives the content associated with the corpus of profiles 320 and, as an optional capability, may aggregate the content (and update count values) within multiple (two or more) profiles of corpus of profiles 320 in the event that these multiple profiles (and corresponding cyberthreats) are associated with the same or related cyberthreat actor group.

After content aggregation, the model application subsystem 400 parses the content from each of the profiles 320 on a per-category basis in order to generate a plurality of feature groupings 465. Each of the feature groupings 465 is a collection of indicia that is associated with a particular category. Hence, where the corpus of profiles 320 contains "L" profiles with "N" categories, the model application subsystem 400 generates LxN feature groupings 465. Each of the feature groupings 465 may undergo feature-similarity conversion 470 and linear weighting 490 into a format recognized by the machine learning-based model 170.

The feature-similarity conversion 470 constitutes a multi-step analysis on content within the profiles 320 to determine levels of correlation between the cybersecurity intelligence clusters associated with each of these profiles 320. A first analytic 472 is conducted on indicia maintained in each category of each profile to produce feature vectors 474. Each feature vector 474 is configured to represent the distinctiveness of indicium within its category for a particular profile. For instance, as an illustrative example, the first analytic 472 may convert each indicium (e.g., term) within each category of each profile into a value, which represents the distinctiveness of that indicium within its category as well as across the entire corpus of profiles 320 accessible to the model application subsystem 400.

Collectively, where a category of the profile has a total of "M" distinct indicium (where M≥1), the M-dimensional feature vector 474 for that category-profile combination is produced. For processing, the dimensions of the feature vectors may be uniform, where different dimensions may be associated with different types of indicium. The first analytic 472 is repetitive for each category within the corpus of profile 320 so that a feature vector is generated for each category of each profile.

Thereafter, a second analytic 475 of the multi-step analysis is conducted among different feature vectors 474 with each category. The second analytic 475 is conducted to determine a level of correlation (similarity value) between categories of different profiles, such as the first profile and any other categorized or uncategorized profiles within the stored corpus of profiles 320 for example. This "similarity value" may be represented by a value within a second prescribed range, where a higher value within the second prescribed range represents a higher correlation between features maintained within a specific category. Following the second analytic 475, similarity vectors 480 are generated from the similarity values (i.e., each vector 480 is a collection of multiple similarity values for each profile within the corpus of profiles 320).

Thereafter, each the similarity vector 480 may be translated into a similarity metric 482 (e.g., a single value associated with a comparison between two cybersecurity intelligence clusters), where similarity metrics associated with different cybersecurity intelligence cluster comparisons are aggregated to form a similarity matrix 485. The similarity matrix 485 allows an analyst to accurately determine, in real-time, the similarity between a reference profile (e.g., the first profile) and one of more other profiles within the corpus of profiles 320. Moreover, the similarity matrix 485 represents levels of correlation between cyberthreat actor groups that are responsible for the cybersecurity intelligence clusters associated with these profiles. To improve performance, the linear weighting 490 (e.g., each weighting <1 and total linear weighting=1), may be applied to some or all of the similarity metrics 482 forming the similarity matrix 485. The weighting is conducted to alter the relevance of certain indicia categories in identifying cyberthreat actor group responsibility based on changes in the threat landscape. Also, by maintaining the results from the first analytic 472 and the second analytic 475, the model application subsystem 400 may provide virtualization as to the level of correlation between features within the profiles being compared as evidence for the conclusions reached by the machine learning-based model 170.

A. Logical Architecture for Model Generation/Application

Figure 5A:
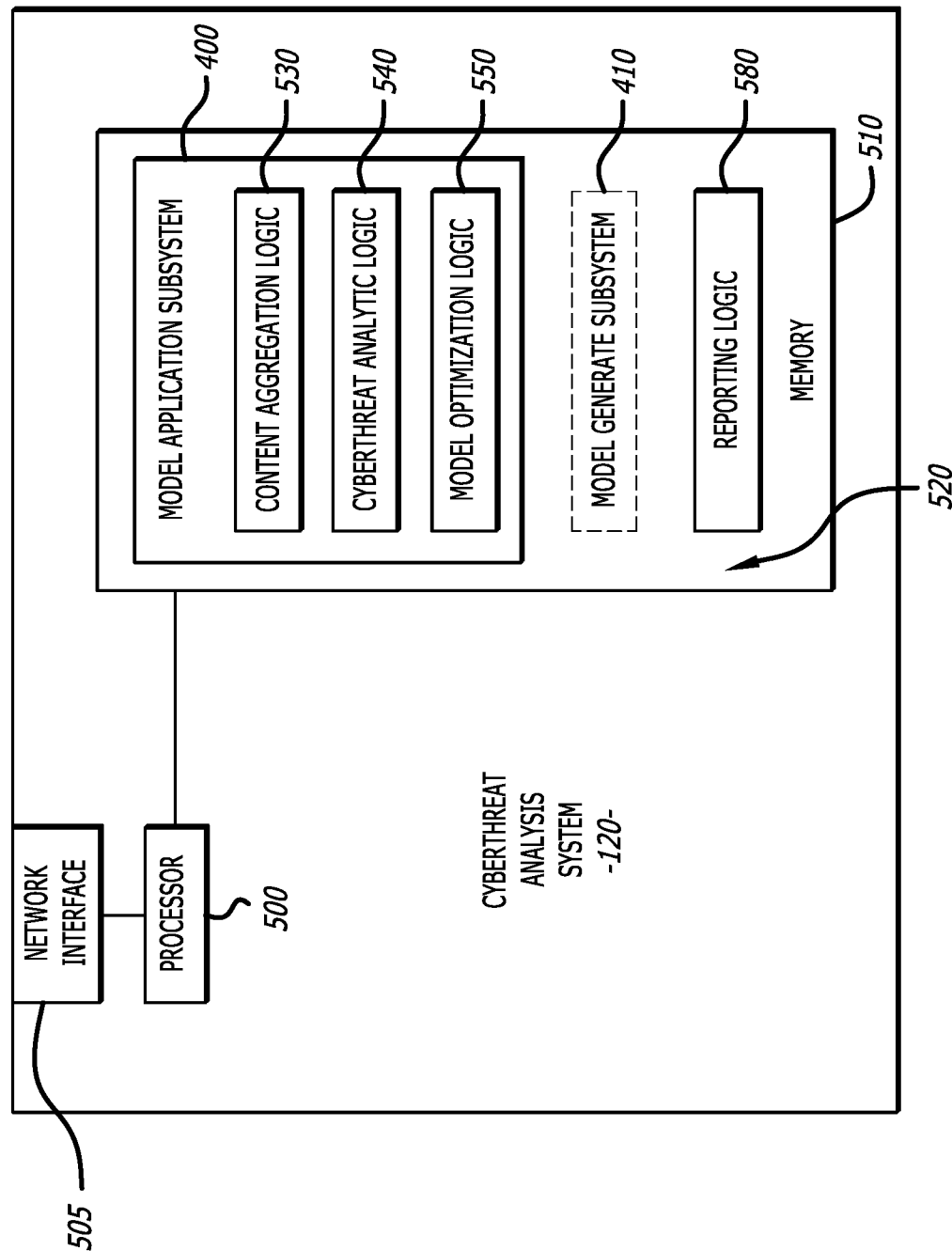
FIGS. 5A-5B are exemplary block diagrams of a logical architecture of the cyberthreat analysis system of FIG. 1.

Referring to FIG. 5A, a first exemplary block diagram of the logical architecture of the cyberthreat analysis system 120 of FIG. 1 is shown. According to one embodiment of the disclosure, the cyberthreat analysis system 120 includes a processor 500, a network/user interface 505 to receive cybersecurity intelligence and other information (e.g., logic or model updates if model generation subsystem 410 is located remotely, etc.), and a memory 510, which is configured to store logic 520 for execution by the processor 500. Examples of the stored logic 520 may include, but is not limited or restricted to model application subsystem 400, optional model generation subsystem 410 (as represented by dashed lines), and reporting logic 580. The model application subsystem 400 further includes content aggregation logic 530, cyberthreat analytic logic 540 and model optimization logic 550, as described below. The logic may be physical devices or virtual devices (e.g., virtual compute engines, virtual memory, etc.). The logical interoperability between the subsystems and logic is illustrated in FIG. 5B.

Figure 5B:
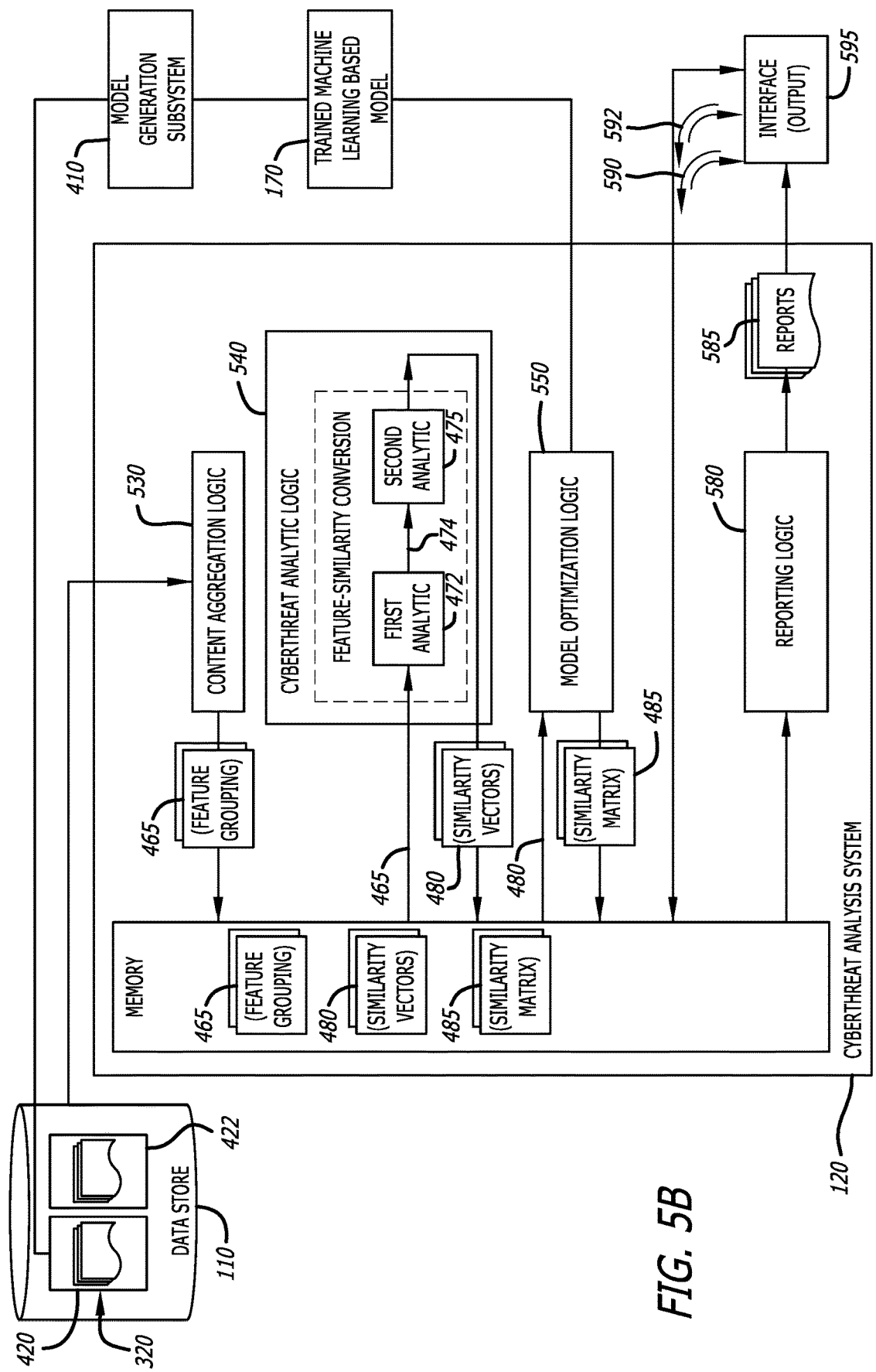

Referring now to FIG. 5B, according to this embodiment of the disclosure, the model generation subsystem 410 is configured to generate machine learning-based model 170, which is configured to evaluate similarities between profiles, each representative of a received cybersecurity intelligence cluster, in efforts to identify and merge cybersecurity intelligence clusters associated with cyberthreats from the same or related cyberthreat actor group. In particular, for this embodiment, the model 170 may be created by converting content within the corpus of profiles 320 into the similarity matrix that includes pre-determined comparisons between any profiles within the corpus of profiles.

More specifically, for this embodiment, the model generation subsystem 410 is configured to generate the machine learning-based model 170 by at least analyzing the contents of the data store 110. In some embodiments, the model generation subsystem 400 accesses the first portion of content 420 maintained within the data store 110 to generate the model 170, and optionally, a second portion of content 422 contained within the data store 110 to verify the model 170.

The model application subsystem 400 receives the model 170 generated by the model generation subsystem and applies the corpus of profiles 320, including the content associated with the "categorized" and "uncategorized" profiles. In particular, the content aggregation logic 530 of the model application subsystem 400 is configured to access information regarding the corpus of profiles 320 (e.g., forensically-related indicia maintained in "categorized" profiles and "uncategorized" profiles) and separate forensically-related indicia associated with each category of the profiles for subsequent processing by the cyberthreat analytic logic. As a result, where each profile is segmented into "N" categories (N≥1, e.g., N=4, 5 or 6), the content aggregation logic 530 produces "N" feature groupings 465 of forensically-related indicia, where each of the feature groupings 465 corresponding to a particular category.

Thereafter, the cyberthreat analytic logic 540 is configured to conduct the multi-step analysis on content associated with the feature groupings 465 to determine levels of correlation between the cybersecurity intelligence clusters associated with each of these profiles 320. The multi-step analysis involves a first analytic 472 that is conducted on content within the feature groupings 465, namely the forensically-related indicia associated with the "N" categories, to produce "N" feature vectors 474. Each feature vector 474 includes a value 545 associated with each feature within that profile category.

Figure 5C:
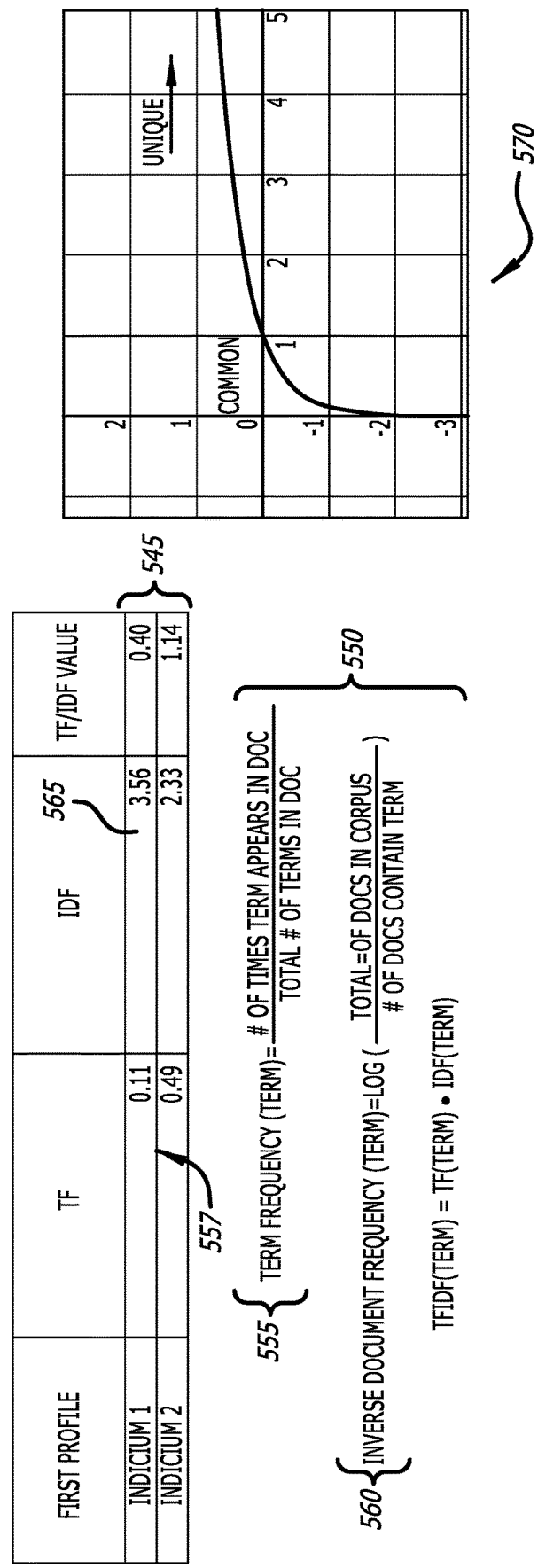
FIG. 5C is an exemplary diagram operability of a first analytic (TD_IDF) conducted by the cyberthreat analytic logic operating within the cyberthreat analysis system of FIG. 1.

According to one embodiment of the disclosure, as shown in FIG. 5C, each value 545 is generated based on a Term Frequency-Inverse Document Frequency (TF-IDF) conversion technique 550 that determines which indicia is more influential in determining a cyberthreat actor group than other indicia.

The TF-IDF conversion technique 550 includes two operations to compute a level of distinctiveness associated with salient information within each cybersecurity intelligence cluster that is represented by forensically-related indicia within the profiles. The first (TF) operation 555 generates a first (TF) value 557 that represents a ratio between (i) how often (count) particular indicium (e.g., term) appeared within content of a profile under analysis and (ii) a total number of all indicia (e.g., terms) within that profile. The second (ITV) operation 560 computes a second (IDF) value 565 of how frequently the particular indicium (e.g., term) appears across all of the profiles. The second (IDF) value 565 is a result produced from a natural logarithmic operation being conducted on a ratio between the total number of profiles within the corpus of profiles and the number of profiles including the particular indicium. As evident by the illustrative graph 570, when the ratio is close to "1" (i.e. very common terms), the logarithmic operation sets the second (IDF) value 565 near-zero, thus down-weighting the value 545 being a product of the first (TF) value 557 and the second (IDF) value 565 (TF×IDF value). Hence, the presence of a much higher second (IDF) value will result in a higher value 545. The values for each indicium within each category for each profile are aggregated to form feature vectors 474 for each category within each profile, as shown in FIG. 5B.

Figure 5D:
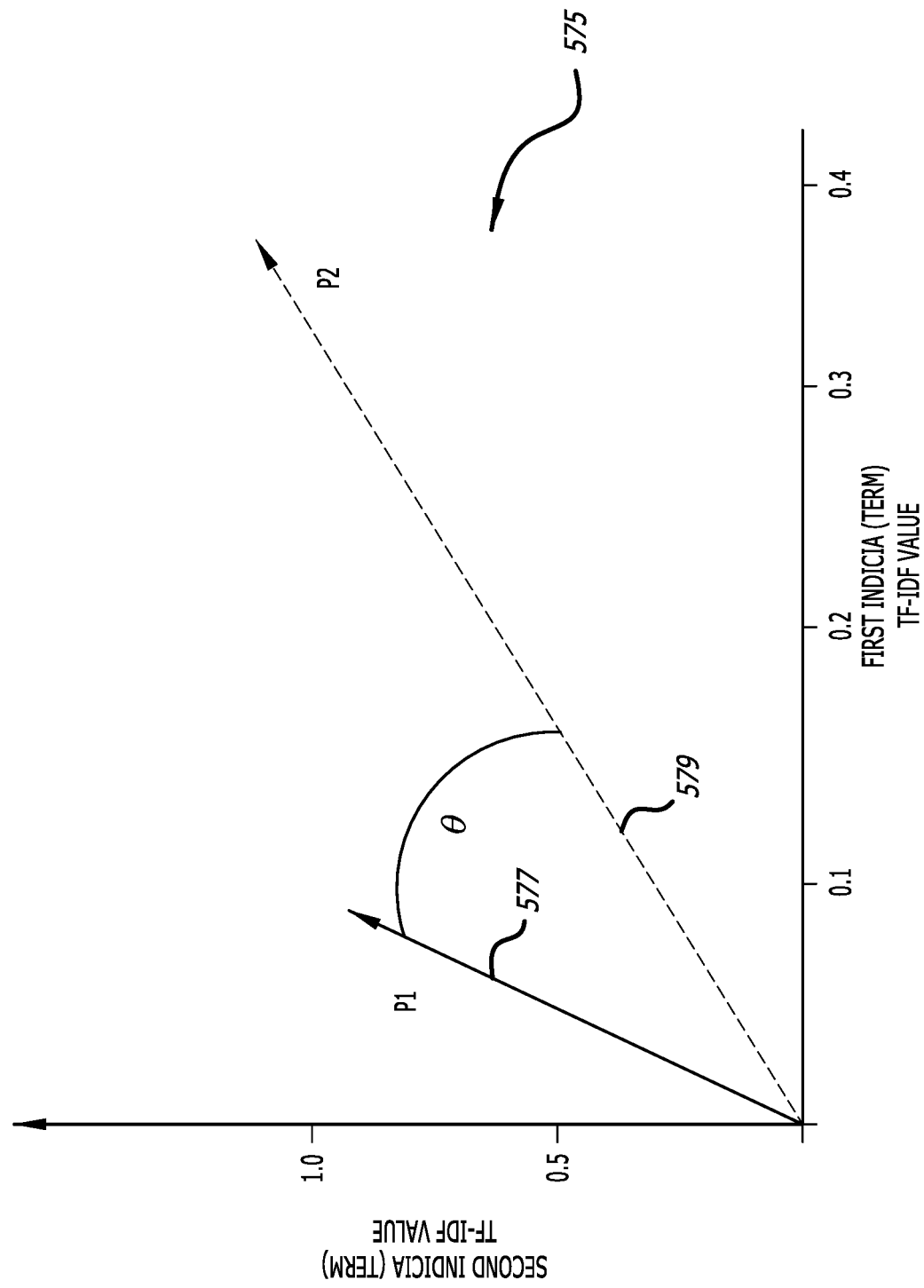
FIG. 5D is an exemplary diagram operability of a second analytic (Cosine Similarity) conducted by the cyberthreat analytic logic operating within the cyberthreat analysis system of FIG. 1.

Referring back to FIG. 5B, the cyberthreat analytic logic 540 is further configured to conduct the second analytic 475 on combinations of feature vectors 474 to determine the difference between cyberthreat actor groups. In some embodiments, feature vector similarity may be determined using, for example, a Cosine Similarity technique 575 as shown in FIG. 5D. The Cosine Similarity technique 575 may be used to evaluate a level of correlation (similarity) of each of the profiles (e.g., first profile "P1" and second profile "P2") by plotting the feature vectors 577 and 579 representative of the cyberthreat. Where the vectors are directed in the same direction (e.g., in parallel), the compared profiles (P1, P2) may be highly correlated. The greater degree of angular offset (θ) from the parallel direction indicates a corresponding diminishing level of correlation (similarity). The level of correlation may be represented by a particular score (i.e., similarity value) within the second prescribed range, where a similarity value towards the ends of this range identifies higher/lower levels of correlation (increased/decreased similarity).

It is contemplated that FIG. 5D illustrates only two of the dozens or hundreds of dimensions, which are used to calculate cosine similarity. Two dimensions are used in this case to allow it to be easily plotted for human viewing. In the example, two Groups are represented by a vector composed of their TF-IDF values for a first indicium (term 1) along an x-axis and a second indicium (term 2) along the y-axis. The cosine value of the angle (θ) between these terms serves as our similarity value. This can also interpreted as a measure of 'how parallel' the two vectors are in this space. In reality we perform this evaluation for all groups, across all terms within each category, and thus arrive as cosine similarity values for each category and each pair of groups in the corpus.

As shown in FIG. 5B, using TF-IDF and Cosine Similarity described above, category-specific similarities (i.e., similarity values) for every combination of profiles within the corpus of profiles. Furthermore, cyberthreat analytic logic 540 may be configured to combine these similarity values associated with category comparisons of a particular profile combination to form a similarity vector 480. The similarity vector 480 may be subsequently used in determining, in real-time, a level of correlation between an identified, cyberthreat actor group associated with a reference profile and one or more cyberthreat actor groups among a corpus of profiles.

As further shown in FIG. 5B, the model optimization logic 550 is configured to convert the similarity vectors 480 into the similarity matrix 485, as described above. According to one embodiment of the disclosure, the model optimization logic 550 may apply a linear weighting of each of the similarity values, without changes to other model functionality, where an operation on the weighted similarity values (e.g., arithmetic operation such as addition) produces a similarity metric associated with a profile comparison. The similarity metrics, generated by weighting and arithmetic operations on the similarity values forming similarity vectors 480 for all profile combinations (e.g., similarity metric=weighting1*(similarity value for malware category+weighting2*(similarity value for targeted industry category+ . . . ), are aggregated as the similarity matrix 485. For a query message 590 (request for a sorting listing of profiles similar to a reference profile) and a merge message 592 (request for a sorted listing of the most common profile pairs), the similarity matrix 485 is accessed and the results are sorted and return to a requesting user for display via interface 595.

Herein, the similarity computations based on TF-IDF and Cosine Similarity are merely illustrative of computations to compute category-specific similarities, as described above. It is contemplated that other approaches may be employed to compute determine the similarity of cybersecurity intelligence.

The reporting logic 580 receives from information associated with merged profiles associated with known and/or unknown cyberthreat actor groups for further investigation by cyberthreat analysts and/or for alerting cybersecurity investigators of such findings. In some embodiments, cybersecurity investigators may receive reports 585, such as displayable or printable listing, charts, graphs for example, which may include information associated with newly merged cyberthreat actor groups to access network and system vulnerability associated with that cyberthreat actor group. Also, the reports may provide for automated remediation by selection of a displayable object, which associates a cybersecurity actors and halts (temporarily or permanently) communications with an originating source of the cybersecurity intelligence.

Figure 6A:
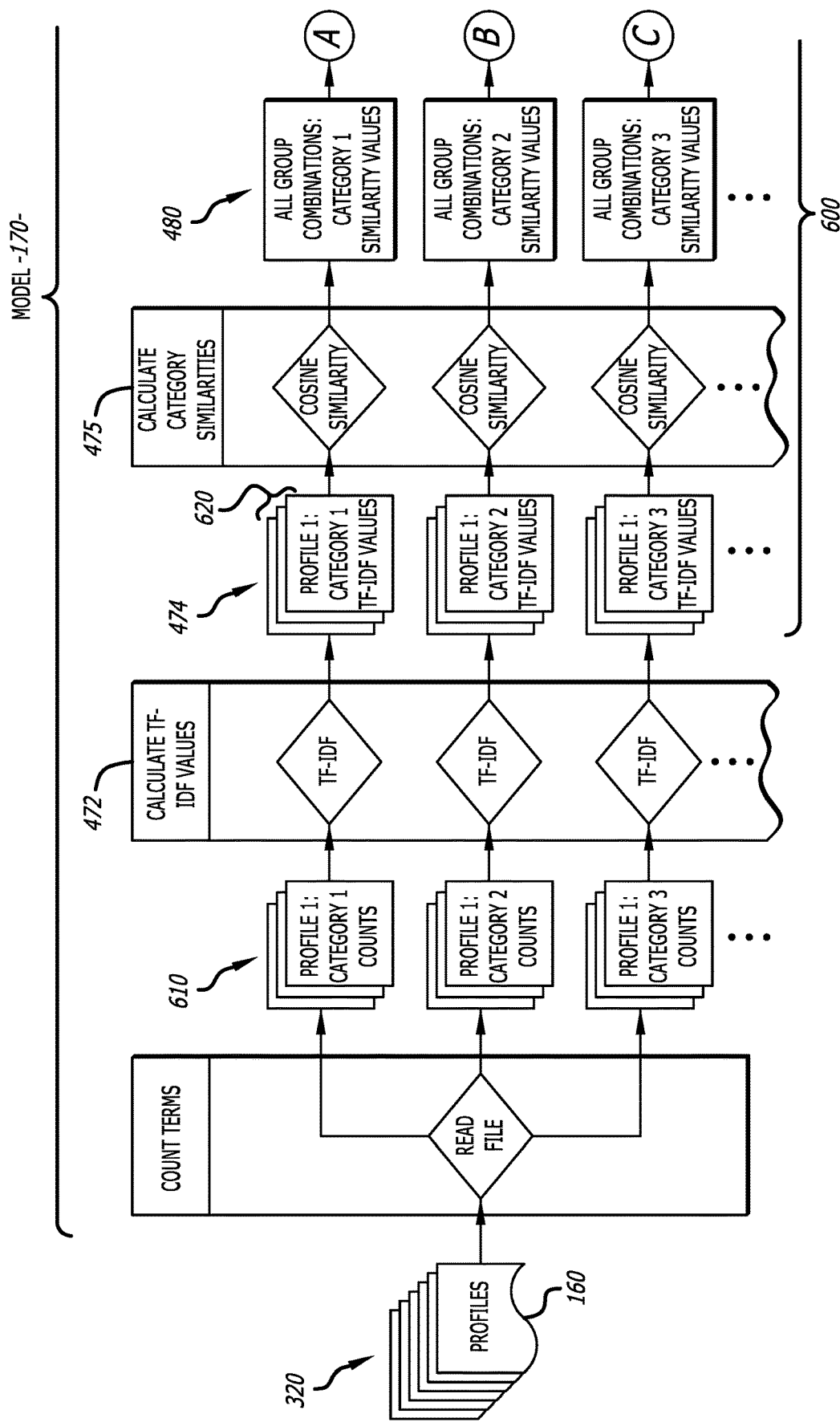
FIG. 6A-6B are exemplary block diagrams collectively illustrating an operational flow of the cyberthreat analysis system of FIG. 5A.
Figure 6B:
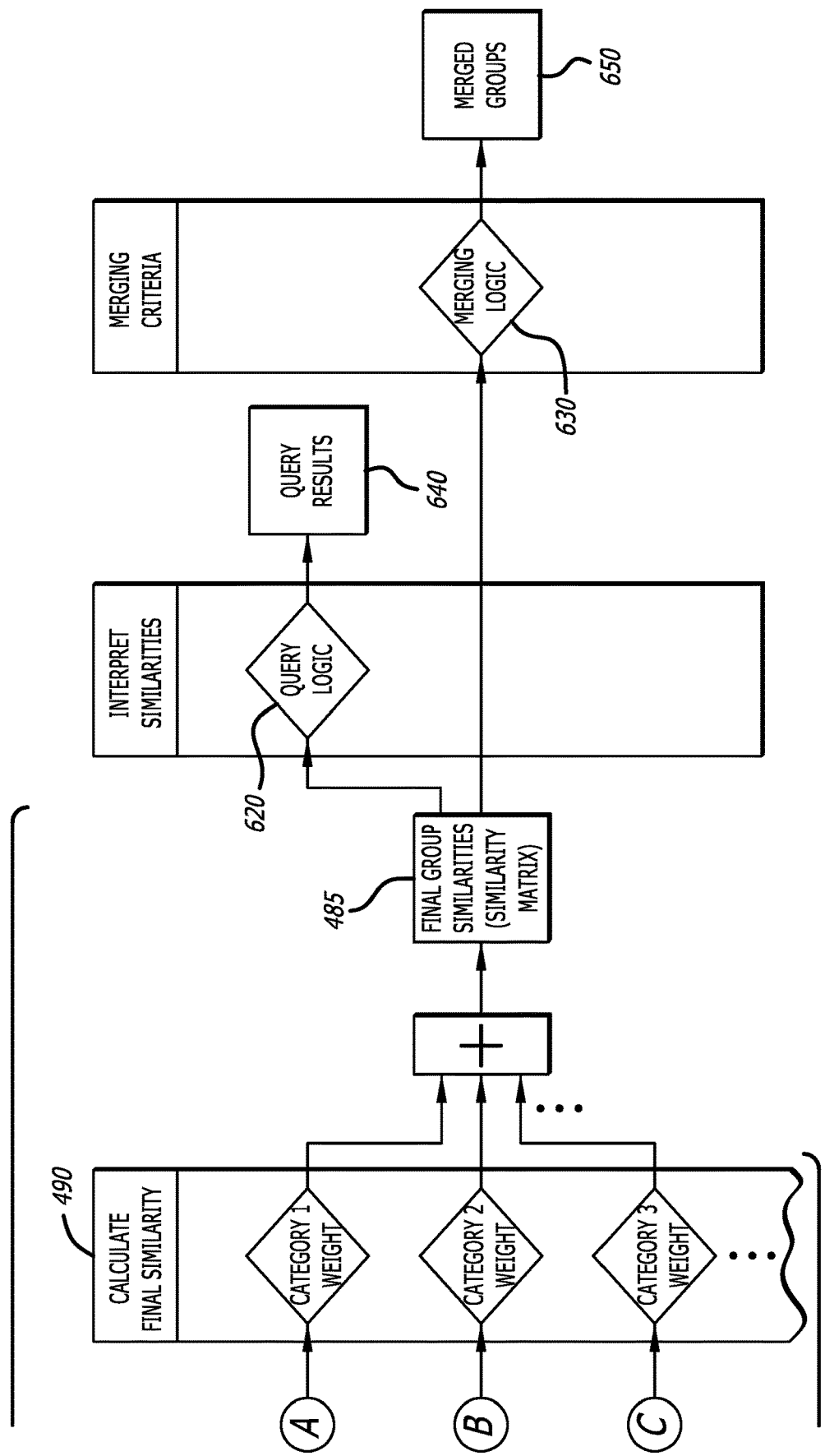

Referring now to FIGS. 6A-6B, exemplary block diagrams of an operational flow of the cyberthreat analysis system 120 of FIG. 5A are shown. According to one embodiment of the disclosure, as shown in FIG. 6A in response to a triggering event (e.g., time-based trigger, change in a profile or predetermined number or percentage of profiles, etc.), the machine learning-based model 170 may be updated by conducting analytics on the indicia included within the any selected profile or a combination of profiles in order to uncover connections between a cyberthreat actor group responsible for a particular cyberthreat or a new of existing cyberthreat actor group being responsible for multiple cyberthreats. Although, as an alternative embodiment, the machine learning-based model 170 may be configured to conduct analytics on a collection of data larger than the profiles 320.

Although not shown, cybersecurity intelligence may be received from one or more network devices and stored within the data store 110 of FIG. 1. The profile 160 may be generated to maintain forensically-related indicia associated with each cybersecurity intelligence cluster and the number of occurrences of each indicium. The categories for indicia to be included in the corpus of profiles 320 are determined by analysts.

As shown in FIG. 6A, operating in accordance with the machine learning-based model 170, the cyberthreat analysis system conducts a multi-step analysis 600 on content within the profiles 320 to determine levels of correlation between the cybersecurity intelligence clusters associated with each of these profiles. The multi-step analysis 600 may be conducted to identify profiles within the corpus of profiles 320 that have similar indicia and/or a determined a level of correlation, and as a result, identifies the cyberthreats represented by these profiles 320 may have been perpetuated by the same cyberthreat actor group or related cyberthreat actor groups.

For this embodiment of the disclosure, the multi-step analysis 600 involves the first analytic 472 conducted on indicia 610 maintained in each profile category to produce feature vectors 474 for each category. Each feature vector 474 is configured to represent the distinctiveness of indicium within its category. More specifically, the results of the first analytic form a feature vector for each category (e.g., Unclassified_Malware1=<0.23, 0.013, 0045, . . . >).

Additionally, the second analytic 475 of the multi-step analysis 600 is conducted between the feature vectors 474 associated with each category of the first profile to feature vectors associated with corresponding categories from the other profiles within the corpus of profiles, which may include other "categorized" profiles and/or "uncategorized profiles 620. The second analytic 475 is conducted to determine a level of correlation (similarity value) between categories of different profiles, such as the first profile and any categorized or uncategorized profiles within the stored corpus of profiles. This "similarity value" may be represented by a value within a second prescribed range, where a higher value within the second prescribed range represents a higher correlation between features maintained within a specific category. The second analytic 475 is further configured to generate a similarity vector 480 (i.e., a collection of multiple similarity values between the first profile and another profile within the corpus of profiles).

Thereafter, the similarity vector 480 may be translated into a similarity metric, where operations are conducted iteratively for all of the profiles to form the similarity matrix 485, which allows an analyst to accurately determine, in real-time, the similarity between a reference profile (e.g., the first profile) and one of more other profiles within the corpus of profiles. According to one embodiment of the disclosure, this translation from the similarity vector 480 to a similarity metric may include conducting a weighted arithmetic operations on the similarity values within the similarity vector 480 as described above. Moreover, the similarity matrix 485 represents levels of correlation between cyberthreat actor groups that are responsible for the cybersecurity intelligence clusters associated with these profiles.

As shown in FIG. 6B, to improve performance, the linear weighting 490 may be applied to some or all of the similarity metrics forming the "similarity matrix." The weighting 490 is conducted to alter the relevance of certain indicia categories in identifying cyberthreat actor group responsibility based on changes in the threat landscape. Also, by maintaining the results from the first and second analytics 472 and 474, the cyberthreat analysis system 120 may provide visibility as to the level of correlation between features within the profiles 320 being compared as evidence for the conclusions reached by the machine learning-based model 170.

Responsive to a query message 620 (request for a sorting listing of profiles similar to a reference profile) or a merge message 630 (request for a sorted listing of the most common profile pairs), the similarity matrix 485 is accessed and the results 640 and 650, respectively. The results 640 and 650 may be sorted and returned for display and review by a cybersecurity investigator.

In the foregoing description, the invention is described with reference to specific exemplary embodiments thereof. As described above, cybersecurity intelligence reports are associated with each other to generate cybersecurity intelligence clusters, which may be assigned to known or unknown cyberthreat actor groups based on analyst conclusions. Herein, in some instances, certain uncategorized cybersecurity intelligence clusters (clusters assigned with an unknown cyberthreat actor group) may be automatically assigned to a particular known cyberthreat actor group based on the model described above. However, it will be evident that various modifications and changes may be made thereto without departing from the broader spirit and scope of the invention as set forth in the appended claims.

What is claimed is:

1. A computerized method, conducted by a machine learning-based model for associating cyberthreat actor groups responsible for different cyberthreats, comprising:
   determining, by the machine learning-based model, a plurality of similarity values, each similarity value representing a level of correlation between indicia associated with a plurality of different profiles within a corpus of profiles, each profile of the corpus of profiles representing a data structure maintaining indicia from a cybersecurity intelligence cluster;
   generating, by the machine learning-based model, a similarity vector for each profile of the plurality of different profiles, each similarity vector corresponding to similarity values associated with a selected profile of the plurality of different profiles and remaining profiles of the corpus of profiles;
   translating, by the machine learning-based model, each similarity vector into a similarity metric; and
   aggregating, by the machine learning-based model, the similarity metrics to generate a similarity matrix,
   wherein, after generation of the similarity matrix, the machine learning-based model is configured to utilize the similarity matrix to automatically determine levels of correlation between at least one of (i) different profiles within the corpus of profiles, (ii) cyberthreat actor groups associated with the corpus of profiles, or (iii) cybersecurity intelligence clusters and cyberthreat actor groups associated with the corpus of profiles.

2. The computerized method of claim 1, wherein the generating of the similarity vectors for the plurality of different profiles includes conducting operations to determine levels of correlation between cybersecurity intelligence clusters and one or more profiles of the corpus of profiles.

3. The computerized method of claim 1, wherein the similarity matrix represents levels of correlation between cybersecurity actor groups that are responsible for cybersecurity intelligence clusters associated with the corpus of profiles.

4. The computerized method of claim 1 further comprising:
   identifying multiple cybersecurity intelligence clusters that appear to be from the same unidentified cyberthreat actor group; and
   updating a profile of the corpus of profiles that is now associated with the multiple cybersecurity intelligence clusters.

5. The computerized method of claim 1, wherein the indicia associated with the plurality of different profiles comprises at least a first feature vector associated with a category of a first profile of the plurality of different profiles and at least a second feature vector associated with a category belonging to a second profile of the plurality of different profiles and corresponding to the category of the first profile.

6. The computerized method of claim 5, wherein each profile of the corpus of profiles is separated into a plurality of categories, each of the plurality of categories is associated with a different indicia type.

7. The computerized method of claim 5, wherein the plurality of categories of different indicia type include (i) names of malware identified within a particular cluster of cybersecurity information, (ii) cyberthreat types identified within the particular cluster of cybersecurity information, and (iii) methods of operation of a cyberthreat.

8. The computerized method of claim 1, wherein prior to determining the plurality of similarity values, the method further comprising:
   conducting analytics on the indicia associated with the plurality of different profiles to produce one or more feature vectors each associated with a category of a profile of the plurality of different profiles, the conducting of the analytics on the indicia comprises
   parsing the indicia on a per-category basis from each profile of the plurality of profiles to be included as part of a plurality of groupings, wherein each grouping of the plurality of groupings including indicia associated with a particular category of the plurality of categories, and
   converting indicia associated with each of the plurality of groupings into a feature vector of the one or more feature vectors, wherein each feature vector identifying a level of distinctiveness for indicium being part of the indicia associated a particular grouping of the plurality of groupings.

9. The computerized method of claim 1, wherein each similarity value representing the level of correlation between indicia associated with a category of a first profile of the plurality of different profiles within the corpus of profiles and indicia associated with a category of a second profile of the plurality of different profiles to determine relatedness between each of the plurality of different profiles.

10. The computerized method of claim 1, wherein the generating of the similarity vector for each profile of the plurality of different profiles comprises aggregating each similarity value representing a correlation between a selected profile of the corpus of profiles and another profile of the corpus of profiles.

11. The computerized method of claim 10, wherein the translating of each similarity vector into the similarity metric comprises applying weighting to each of the similarity values associated with a selected profile of the plurality of different profiles.

12. The computerized method of claim 11, wherein the weighting corresponds to coefficients learned from the machine learning-based model during training with sampled, test profiles.

13. The computerized method of claim 1, wherein the similarity values are determined based on a Cosine-Similarity operation conducted between at least two feature vectors and each of the feature vectors being associated with a category of a different profile of the plurality of different profiles.

14. A computerized method, conducted by a machine learning-based model during execution, for associating cyberthreat actor groups responsible for different cyberthreats, comprising:
   conducting a first analytics on content within different profiles of a corpus of profiles to determine a level of correlation between cybersecurity intelligence clusters associated with each of the different profiles; and
   conducting a second analytics to identify a plurality of profiles within the corpus of profiles that possess a determined level of correlation to each other, and as a result, identifies cyberthreats represented by the plurality of profiles being perpetrated by a same cyberthreat actor group or related cyberthreat actor groups.

15. The computerized method of claim 14, wherein the first analytics comprises determining levels of correlation between different profiles within the corpus of profiles.

16. The computerized method of claim 14, wherein the second analytics comprises generating a similarity matrix configured to automatically determine levels of correlation between cyberthreat actor groups that are responsible for the cybersecurity intelligence clusters associated with the corpus of profiles.

17. The computerized method of claim 14, wherein the second analytics comprises determining levels of correlation between cyberthreat actor groups that are responsible for cybersecurity intelligence clusters associated with the corpus of profiles.

18. The computerized method of claim 14, wherein the second analytics further comprises (i) identifying two or more of the cybersecurity intelligence clusters that appear to be from a same cyberthreat actor group, and (ii) updating a profile of the corpus of profiles to be associated with the two or more cybersecurity intelligence clusters.

19. The computerized method of claim 14, wherein the conducting of the first analytics comprises:
  determining a plurality of similarity values, each similarity value representing the level of correlation between indicia pertaining to the content within the different profiles of the corpus of profiles.

20. The computerized method of claim 19, wherein the conducting of the second analytics comprises:
  generating a similarity vector for each profile of the corpus of profiles, each similarity vector corresponding to similarity values associated with a selected profile of the different profiles and remaining profiles of the corpus of profiles other than the selected profile;
  translating each similarity vector into a similarity metric; and
  aggregating the similarity metrics into a similarity matrix, the similarity matrix being utilized by a machine learning-based model to automatically determine levels of correlation between at least one of (i) different profiles within the corpus of profiles, (ii) cyberthreat actor groups associated with the corpus of profiles, and (iii) cybersecurity intelligence clusters and cyberthreat actor groups associated with the corpus of profiles.

21. A non-transitory computer readable medium including software that, upon execution by one or more processors, performs one or more operations, comprising:
  content aggregation logic configured to access information regarding a plurality of profiles and associated indicia including maintained the plurality of profiles, each profile of the plurality of profiles being a representation of the cluster of cybersecurity information and including information specifying one or more categories of different indicia types;
  cyberthreat analytic logic configured to generate similarity values for each profile of the plurality of profiles by at least determining a level of correlation between indicia associated with categories associated with a similar indicia type from different profiles of the plurality of profiles and collecting the similarity values for each profile to generate a similarity metric; and
  logic configured to generate a similarity matrix based on content from clusters of cybersecurity information, wherein the similarity matrix includes a plurality of similarity metrics for a corpus of profiles including the plurality of profiles and is used by a machine learning-based model to automatically determine levels of correlation between at least one of (i) different profiles within the corpus of profiles or (ii) different cyberthreat actor groups associated with the corpus of profiles.

22. The non-transitory computer readable medium of claim 21, wherein, based on use of the similarity matrix, the machine learning-based model is further configured to automatically determine levels of correlation between cybersecurity intelligence clusters and cyberthreat actor groups associated with the corpus of profiles.

23. The non-transitory computer readable medium of claim 21, wherein the cyberthreat analytic logic generates the similarity vectors for the plurality of different profiles by at least conducting operations to determine levels of correlation between cybersecurity intelligence clusters and one or more profiles of the corpus of profiles.

24. The non-transitory computer readable medium of claim 21, wherein the similarity matrix represents levels of correlation between cybersecurity actor groups that are responsible for cybersecurity intelligence clusters associated with the corpus of profiles.

25. The non-transitory computer readable medium of claim 21, wherein the indicia associated with the plurality of profiles comprises at least a first feature vector associated with a category of a first profile of the plurality of profiles and at least a second feature vector associated with a category belonging to a second profile of the plurality of profiles and corresponding to the category of the first profile.

26. The non-transitory computer readable medium of claim 25, wherein each profile of the plurality of profiles is separated into a plurality of categories, each of the plurality of categories is associated with a different indicia type.

27. The non-transitory computer readable medium of claim 25, wherein the plurality of categories of different indicia type include (i) names of mal ware identified within a particular cluster of cybersecurity information, (ii) cyberthreat types identified within the particular cluster of cybersecurity information, and (iii) methods of operation of a cyberthreat.

* * * * *